Dec. 20, 1966  H. T. GRUT  3,292,710
VARIABLE PITCH PROPELLER OR ROTOR
Filed Nov. 23, 1964  5 Sheets-Sheet 1

Dec. 20, 1966    H. T. GRUT    3,292,710
VARIABLE PITCH PROPELLER OR ROTOR
Filed Nov. 23, 1964    5 Sheets-Sheet 4

Dec. 20, 1966  H. T. GRUT  3,292,710
VARIABLE PITCH PROPELLER OR ROTOR

Filed Nov. 23, 1964  5 Sheets-Sheet 5

United States Patent Office 3,292,710
Patented Dec. 20, 1966

3,292,710
VARIABLE PITCH PROPELLER OR ROTOR
Hugo T. Grut, Grevgaten 12, Stockholm, Sweden
Filed Nov. 23, 1964, Ser. No. 412,939
21 Claims. (Cl. 170—160.1)

The blade of an air propeller or rotor may be considered as a twisted wing, and the cross sections of the blade are essentially of the same shape as those of an aircraft wing or airfoil.

The chord of an airfoil section is defined as the line joining the centres of curvature at the leading and trailing end of the section, and the angle $\beta$ that the chords of the sections of a propeller blade form with a plane perpendicular to the axis of the propeller is called the blade angle. Since blade sections with a straight lower contour line often occur, this line may conveniently be identified with the chord.

The geometrical pitch $p$ of an element of a propeller blade is the distance which an element would advance along the axis of rotation in one revolution if it were moving along a helix of radium $r$ and of slope equal to its blade angle $\beta$, which is also called the geometrical pitch angle. Thus $$\tan \beta = \frac{p}{2\pi r}$$

and if R is the tip radius and $r/R=x$, i.e. the dimensionless radius or station of the blade, then $$\tan \beta = \frac{p}{2\pi Rx} = \frac{p}{\pi Dx}$$

and $$\beta = \tan^{-1} \frac{p}{\pi Dx} \qquad (1)$$

where D is the diameter of the propeller. If all the elements of a propeller have the same geometrical pitch $p$ the propeller is said to have uniform geometrical pitch.

When a propeller is rotated in a fluid under continuing relative motion between the propeller and the surrounding fluid in the direction of the propeller axis, each point on the propeller will define a helical line in the fluid, the slope or path angle $\varphi$ of the line relative to a plane perpendicular to the axis of rotation depending on the distance $r$ of the point from the propeller axis, the angular velocity $\omega$ of the propeller, and the velocity V of the propeller in the direction of the propeller axis relative to a particle of the surrounding fluid not influenced by the movements of the propeller, i.e. the free stream velocity (V). It follows that $$\tan \varphi = \frac{V}{\omega r}$$

but $\omega = 2\pi n$ where $n$ is the rotational speed, so that $$\tan \varphi = \frac{V}{2\pi nr} = \frac{V}{2\pi nRx} = \frac{V}{\pi nDx} = \frac{J}{\pi x}$$

where $$J = \frac{V}{n \cdot D}$$

is called the advance ratio. Thus $$\varphi = \tan^{-1} \frac{J}{\pi x} \qquad (2)$$

According to (2) the path angle $\varphi$ will vary at any give station $x$ of the blade in dependence upon the advance ratio J. This is confirmed by the fact that a propeller may have a variety of forward speeds V at the same speed of revolution $n$.

The advance per revolution $V/n$ is called the effective pitch $p_e$, so that $$p_e = V/n \text{ and } p_e/D = J$$

Thus $$p_e/\pi Dx = J/\pi x$$

which combined with 2 gives $$\varphi = \tan^{-1} \frac{p_e}{\pi Dx} = \tan^{-1} \frac{J}{\pi x} \qquad (3)$$

The path angle $\varphi$ is therefore also called the effective pitch angle.

When a propeller is operating at constant advance ratio J, each point on the blade moves forward the distance of the effective pitch $p_e$ along the axis in one revolution. The surface swept by the blade during its forward helical motion will thus according to (3) be a true helical surface.

A propeller blade, however, is not shaped like a strip of an exact helical surface with a constant pitch of all elements, but may be considered as composed of helical elements with slightly varying pitch, and the geometrical pitch is thus somewhat different at different stations $x$ of the blade; cf. (1) in which $p$ is not necessarily a constant. The reason for this will be evident from the following account.

The order to provide a force or thrust in the direction of advance a propeller must accelerate a mass of air in the opposite direction, and to do so the blade angle $\beta$ must usually exceeds the path angle $\varphi$ with a quanity $\alpha$ which is called the angle of attack. Thus $$\alpha = \beta - \varphi$$

and inserting the values of the blade angle $\beta$ and the path angle $\varphi$ as from (1) and (3), gives $$\alpha = \tan^{-1} \frac{p}{\pi Dx} - \tan^{-1} \frac{p_e}{\pi Dx}$$

$$= \tan^{-1} \frac{p}{\pi Dx} - \tan^{-1} \frac{J}{\pi x} \qquad (4)$$

For each airfoil section there exists an optimum angle of attack $\alpha$ for which the ratio of lift to drag attains its maximum value. The designer of a propeller may try to obtain for each blade section the corresponding optimum angle when the propeller operates at the advance ratio J of design, or at the advance ratio at which the maximum efficiency is desired, cf. (4).

For most airfoils the optimum angle of attack $\alpha$ is small and does not exceed a few degrees in magnitude, whereas the path angle $\varphi$ is of the order of several tens of degrees when the propeller is operating at its upper advance ratios J. Now, the area swept by the blade in the plane of rotation is called the disc area, and the air passing through this area is given an increase of axial velocity by the propeller. The increase, arising from the rotational movement of each blade, is highly periodic in nature, so when considered as an average velocity increment, usually called the induced velocity, over the whole disc, it will be small as compared with the free stream velocity V at high advance ratios J. But $$\beta = \alpha + \varphi$$

so according to (3)

$$\beta = \alpha + \tan^{-1} \frac{p_e}{\pi Dx}$$

$$= \alpha + \tan^{-1} \frac{J}{\pi x} \qquad (5)$$

Assuming that the air passes through the entire disc area with the free stream velocity V, and that the angle of attack $\alpha$ being small as compared with the path angle $\varphi$, may be neglected, it follows that $$\beta \simeq \tan^{-1} \frac{p_e}{\pi Dx}$$

$$\simeq \tan^{-1} \frac{J}{\pi x} \quad (6)$$

in other words $$\beta \simeq \varphi$$

and the propeller should have uniform geometrical pitch, i.e. a constant pitch distribution when operating under such conditions.

In most cases, however, a propeller operates near a body such as a power plant, an engine cowling, a fuselage or a wing which reduces the free stream velocity V of the air through the disc area. For experimental purposes special arrangements may be made for a propeller to operate with very little body interference, and for such cases uniform or constant geometrical pitch at all stations of the blade gives, as expected from (6), very nearly the highest efficiency; but when a propeller operates near a body which it generally does, the reduction of the free stream velocity V due to body interference is usually more pronounced near the centre of the disc, and designers therefore reduce the pitch progressively towards the hub of rotation to meet the conditions of slower flow in this area.

It is thus clear that the free stream flow is usually less interfered with at the outer parts of the disc area, and it follows that a uniform or nearly uniform pitch distribution over the outer portions of the blade will in most cases result in the best efficiency over the corresponding part of the disc area, so propellers may in general be said to have propulsive efficiencies in the order in which their pitch distributions fit the flow conditions set up by the interfering body or by other factors.

A general approximate rule for the pitch distribution along the blade may now be stated:

In order to achieve maximum efficiency at the advance ratio of design J the geometrical pitch $p$ should be substantially uniform over the outer portions of the blade and slightly exceed the value of the advance per revolution $V/n$, i.e. the effective pitch $p_e$, and should further decrease progressively towards the root of the blade to fit the conditions of slower flow set up by interference near the hub.

The rule being general applies almost independently of the magnitude of the advance ratio of design, but for very low advance ratios, $$\tan^{-1} \frac{J}{\pi x}$$

may be replaced by $J/\pi x$, giving $$\beta = \alpha + \frac{J}{\pi x}$$

which indicates that an approximate expression for the blade angle $\beta$ may, for reasons which will not be accounted for here, be written $$\beta = \alpha_0 + \frac{\Delta}{x^{1/2}} \quad (7)$$

where $\alpha_0$ and $\Delta$ are constants. Equation 7 is used to determine the blade angle at any station $x$ of the blade of a helicopter rotor and, hence, the twist of the blade in order to obtain a good hovering performance, i.e. a high static thrust.

When adjusting the blades of a variable pitch propeller of conventional design each blade is made to rotate about a longitudinal axis thereby giving the whole rigid blade the same change of blade angle $\beta$. Assuming the geometrical pitch $p$ to be uniform over the outer half of the blade of the variable pitch propeller when adjusted to operate at the advance ratio of design J, the pitch will no longer be uniform after readjustment of the propeller.

The reason for this is that a blade element at the tip travels a distance per revolution which is approximately twice as long as the corresponding distance travelled by an element at the centre of the blade, but the change of blade angle $\beta$ due to the readjustment is the same for both elements and will, because of the longer distance travelled by the element at the tip, cause a greater change of pitch $p$ at the tip than at the centre of the blade. The pitch $p$ will thus no longer be uniform or constant over the mentioned outer half of the blade, and if a wide range of advance ratios has to be covered by the variable pitch propeller of conventional design it proves impossible to arrive at a satisfactory compromise giving high working efficiency over the whole range.

From the preceding argument it is seen that an adjustable rigid blade will only operate efficiently within a narrow range of advance ratios J at the point of design, and in order to maintain the geometrical pitch substantially uniform over the outer active part of the blade in different positions of adjustment it is, for reasons which will be further accounted for later, necessary to change the twist of the blade, so as to make each section operate at more nearly the previously mentioned optimum of attack $\alpha$, providing the maximum lift-drag ratio along the whole blade and thus maximum efficiency at low as well as high advance ratios J.

The present invention is concerned with what may be termed a variable-twist propeller or rotor and is a development or modification of the invention forming the subject matter of my British Patent No. 880,590.

In the specification accompanying the aforesaid Patent there is described a propeller being characterised by the fact that the blades thereof are capable of being twisted in such a manner as to provide for aerodynamic blade adjustment such as will enable the propeller to work efficiently within a wide range of rotational speeds and a wide range of velocities in the direction of the propeller axis from zero velocity upwards. In that specification it is proposed that each blade of the propeller will comprise a hollow outer mantle or shell of airfoil form, such mantle being fixedly connected at its outer end or tip to the outer end of a rigid rod which is disposed within the mantle and projects radially outwards from the propeller hub, there being means whereby a torque may be applied to the inner or hub end of the mantle and the rod in order to twist the mantle relative to the rod and rotate the whole blade about a longitudinal axis, thereby to vary the twist and pitch of the blade to suit particular requirements or sets of circumstances.

Previous attempts to solve the structural and aerodynamic problems connected with variable twist propellers have not been successful partly because of ungainly design, further disadvantages resulting from elaborate, but nevertheless discontinuous and consequently insufficient means for supporting the mantle in relation to the rod, thus impairing the rigidity and accuracy of blade shape.

The propeller or rotor according to the present invention is more specificly characterised by means disposed continuously along the mantle and the rod for limiting the angular displacement of the mantle in different positions of adjustment and allowing different transverse sections of the mantle different degrees of angular displacement relative to the rod, said means enabling the blade to be adjusted to different values of geometrical pitch, distributed substantially uniformly along the outer, aerodynamically active part or working portion of the blade and decreasing continuously and progressively towards the root of the blade. The mentioned distribution of geometrical pitch may also be found when no torque is applied to the mantle and rod.

Said continuously disposed means of this improved propeller or rotor will thus make it possible to adjust the blade accurately and rigidly to other kinds of pitch distribution, and for at least one of the positions of angular adjustment the geometrical pitch- or blade angle $\beta$ may be set to values defined by the formula $$\beta = \alpha_0 + \frac{\Delta}{x^{1/2}}$$

$x$ being the dimensionless radius or station of the blade, and $\alpha_0$ and $\Delta$ constants. The blade may have the geometrical pitch distribution defined by the formula just stated when no torque is applied to the mantle and rod.

According to the invention the means disposed continuously along the mantle and the rod may constitute collaborating stop surfaces arranged substantially over the entire length of the blade, and a favourable manner of giving shape to the stop surfaces is to make the rod comprise at least one continuous longitudinal ridge with side faces constituting said stop surfaces which are thus arranged along the rod in order to collaborate with corresponding stop surfaces inside the mantle.

According to an embodiment of the invention the mantle may be transversely laminated and composed of slabs of different thickness and resilience, and each slab connected to and fixed against rotation relative to adjacent slabs. The mantle may also be coated with resilient and tough material.

An object of the invention is to provide means by which a fluid under pressure is made to act on the mantle, the rod and one or more sealing diaphragms arranged therebetween, whereby the torque is applied to the former two members, and in so doing the fluid may be attacking stop surfaces disposed along the mantle and the rod, and occupying substantially all cavities between those two members, further components for sealing of the pressure fluid being suitably of the nature of bellows arranged between mantle, rod and diaphragms.

A further characteristic of the invention is a number of thrust bearing devices fitted between the mantle and the rod at suitable intervals along the longitudinal axis of the blade in order to fix the mantle against longitudinal displacement relative to the rod in consequence of the centrifugal forces acting on the mantle during rotation of the propeller.

The first figures of the accompanying drawings, numbered 1 to 4, are schematic accounts of the fundamental aerodynamic principles and also show the attained technical effect of the invention.

FIGURES 5 then shown an embodiment of the propeller or rotor according to the invention.

FIGURES 6 show an aircraft in different attitudes and are intended to indicate one of the branches of areonautics in which the propeller or rotor according to the invention is suited to find application.

In FIGURE 1a & 2a the scale of FIGURE 1a and FIGURE 2a has been doubled and the two latter figures superposed one another.

FIGURES 5–I, 5–II, 5–III and 5–IV are cross sections taken in the joint between two laminae at stations along the blade specified on FIGURE 5 by the lines I—I, II—II, III—III and IV—IV respectively, each of the 3 former figures showing the mantle in 3 different positions of adjustment, the latter, FIGURE 5–IV, showing sealing devices and fluid ducts at the hub end of the blade.

FIGURES 5 also show a membrane coating the mantle.

In the FIGURES 6A, 6B, 6C and 6D are exhibited some fundamental aeronautic characteristics of the design of a vertical and/or short takeoff and landing, i.e. a V/STOL propeller or rotor thrust-tilting aircraft shown in different attitudes for vertical or short takeoff.

Figure 1:
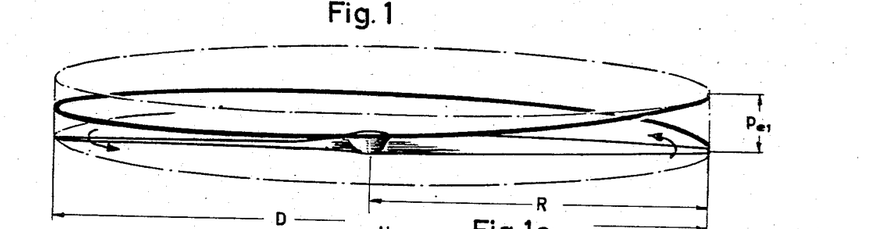
FIGURES 1 and 2 are schematic views in perspective of two propellers operating at low and high advance ratio respectively.
Figures 1A, 2A:
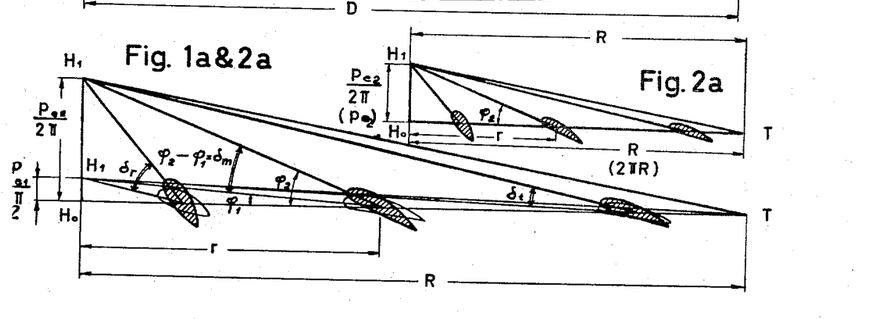
FIGURES 1a and 2a are diagrams showing the geometric characteristics of a uniform pitch distribution along two propeller blades intended to operate at said low and high advance ratio respectively.
Figures 1A, 2:
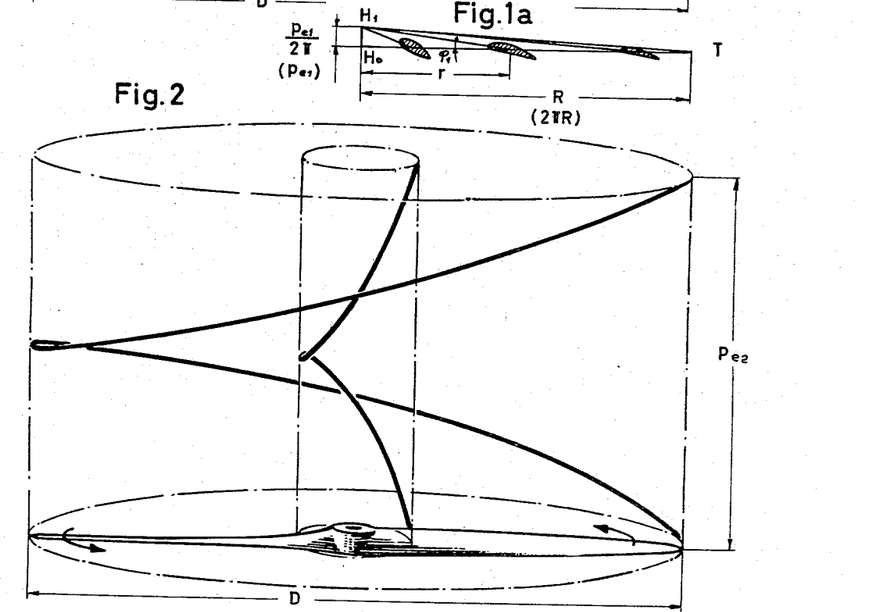

The two propellers shown in the FIGURES 1 and 2 move forward the distance $p_{e1}$ and $p_{e2}$ respectively per revolution, i.e. the distance of the effective pitch, in the direction of the axis relative to the surrounding fluid. In so doing a point situated at the tip of the blade will describe the helix shown in the drawings. All the helices described per revolution by one and each of all points along the blade will have the distance $p_{e1}$ and $p_{e2}$ respectively in common.

If the curved surface of the cylinders shown in FIGURE 1 and FIGURE 2 is cut along the generating line situated in the drawings at the tip of the propeller blade to the right and developed in the plane, a figure similar to FIGURE 1a and FIGURE 2a respectively will arise. The distance along the base of the figure thus developed will be $2\pi R$, i.e. the circumference of the cylinders, and the distance of the figure perpendicular thereto will be the effective pitch $p_{e1}$ and $p_{e2}$ respectively, whereas the helix is developed in the plane as a straight, sloping line joining the right end of the base with the end of the perpendicular at the left of the figure, and the slope of the line relative to the base will define the effective pitch or path angle $\varphi$ of a point situated at the tip of the blade.

If all dimensions of the figure just mentioned are multiplied by the factor $1/2\pi$ those figures will be uniformly diminished, and it is seen from the drawing that this is how the FIGURES 1a and 2a have arisen.

The path angle $\varphi$ of an arbitrary point along the propeller blade may now be constructed thus:

The radial distance of the point from the propeller axis is plotted along the base from $H_0$, and a straight, sloping line drawn joining the point $H_1$ and the point plotted; this line will intersect the base in the point plotted, and the angle measured between the line and the base will be the path angle $\varphi$ described by the point as the rotating blade moves forward in the direction of the propeller axis.

As previously accounted for the Equations 3 and 6 combined give $$\beta \simeq \varphi = \tan^{-1} \frac{p_e}{\pi D x} = \tan^{-1} \frac{J}{\pi x}$$

confirming that the angle of attack $\alpha$ will be small for lightly loaded propellers operating with little body interference. The equation further shows, that since $p_e/D = J$ and $p_{e1} < p_{e2}$ the two propellers will be operating at different advance ratios, and as will subsequently be realised this will require a greater twist of the blades of the propeller operating at the higher advance ratio.

In FIGURE 1a and FIGURE 2a are shown three cross sections taken along the propeller blade at the points of intersection between the base line $H_0T$ and three of the sloping lines emanating from the point $H_1$, and each section has been rotated an angle of 90° about an axis parallel to the propeller axis so that its slope may be compared with the slope of the corresponding sloping line. It is observed from the figures that the blade angle (usually denoted $\beta$) of each section only exceeds the corresponding path angle $\varphi$ with a small quantity, viz. the angle of attack (usually denoted $\alpha$), and the pitch distribution will therefore be substantially constant or uniform along the blade.

According to FIGURE 1a and FIGURE 2a, $\varphi_1$ and $\varphi_2$ are the path angles of a given point on the blade of radius $r$, and it is seen from FIGURE 1a & 2a that $$\varphi_2 - \varphi_1 = \delta_m$$

and that the relationship $$\delta_t < \delta_m < \delta_r$$

holds good regarding the angles denoted by the letter $\delta$ in that latter figure, $\delta_t$, $\delta_m$ and $\delta_r$ being the difference between the path angles according to FIGURE 2a and FIGURE 1a at the tip, the middle and the root of the propeller blade respectively.

It is thus realised, that in order to adapt the blade for efficient operation under the specific flow conditions at different advance ratios J, the required change of blade angle $\beta$ at a section closer to the tip is smaller than that required at a section closer to the root of the propeller blade, so that it will be necessary to twist the blade in order to maintain substantially uniform pitch, and at the same time adjust it in order to make each blade section operate at that optimum angle of attack $\alpha$ for which the ratio of lift to drag of the section attains its maximum value.

Figure 3:
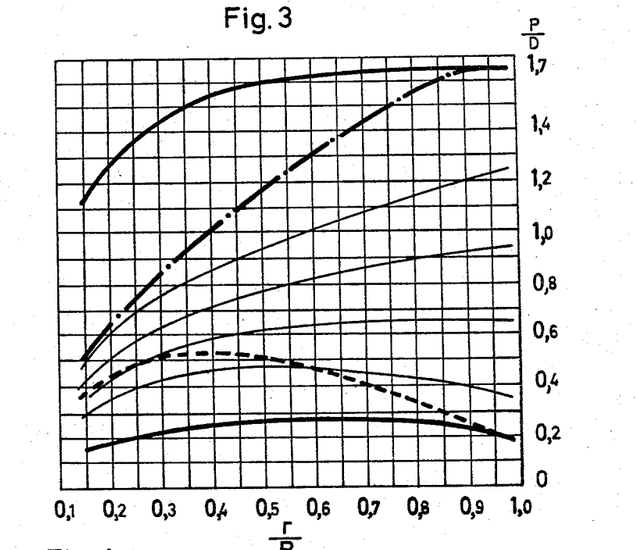
FIGURE 3 is a diagram showing the geometrical pitch distribution of a conventional propeller blade in different positions of angular adjustment, and also the pitch distribution of a blade according to the invention shown in two different positions of adjustment and provided with means for adjusting the twist of the blade.

In FIGURE 3 values of the ratio of geometrical pitch $p$ to propeller diameter D have been plotted against corresponding values of blade station $x$, i.e. $p/D$ against $x=r/R$, in the case of two different propeller blades. A uniform geometrical pitch distribution will thus be represented in the diagram by a straight line parallel to the axis of abscissa.

The thin lines in the diagram show the pitch distribution of a conventional propeller blade, the pitch of which has been changed by altering the blade angle of the whole solid blade and fixing it in 4 different values of angular adjustment. It is seen from the figure that the blade will only exhibit a substantially uniform pitch distribution over its outer active part in one of the positions of adjustment.

The thick and dashed lines point out the geometrical pitch distribution of a propeller blade, adjustable in accordance with the main principle of the invention.

According to the lower thick, solid line the pitch distribution has a low value along the whole blade, so that in this position of adjustment the blade will, as is evident by comparing FIGURE 1a with FIGURE 2a, be comparatively flat.

The blade according to the invention is, however, in a manner which will be more distinctly accounted for below designed to allow different transverse sections different degrees of angular displacement in order to attain the pitch distribution exhibited in the figure by the lower of the dashed lines.

If from this position of adjustment the whole blade is given a limited rotative displacement about a longitudinal axis in order to augment the geometrical pitch, a pitch distribution in accordance with the upper, thick solid line will be attained, and it is observed that the substantially uniform pitch distribution aimed at has thus been maintained over the outer active part or working portion of the blade. By comparing FIGURE 2a with FIGURE 1a it is evident that the blade is more twisted in this latter position of adjustment.

As a matter of course it is possible to return the blade from this position of adjustment to the original position by altering the blade twist first. The pitch distribution indicated by the upper, point dashed line will then be obtained, and the shape of the blade has thereby been restored so that a rotative displacement of the whole blade will return it to the position of adjustment first considered. The adjustment of the blade from one of these two extreme positions to the other may thus be carried through independently of the chosen sequence of the separate movements of adjustment.

The means for blade adjustment according to the invention will thus render it possible to make the propeller operate with optimum pitch distribution at each one out of two advance ratios wide apart.

Figure 4:
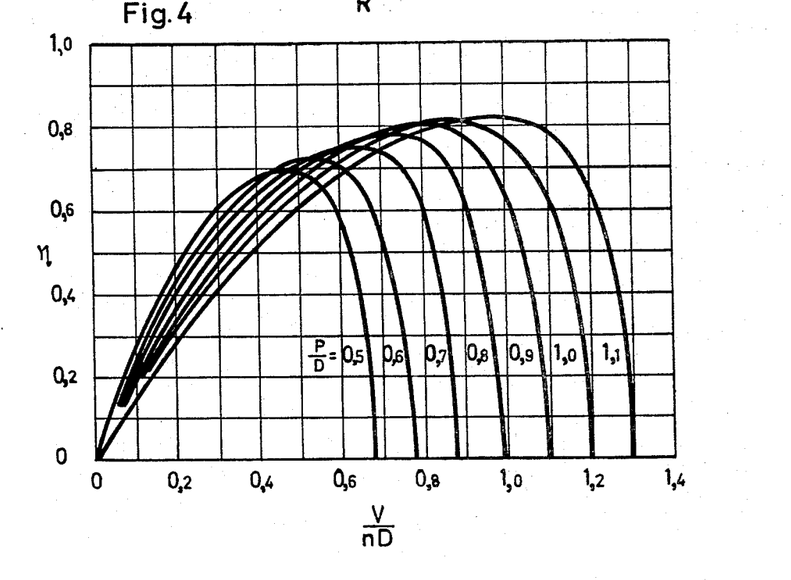
FIGURE 4 is a diagram comprising some of the results of experiments made with a propeller adjustable according to the principles of the invention and shows curves of efficiency $\eta$ plotted against advance ratio J.

In FIGURE 4 the graphs of the diagram are the result of tests carried out in a wind tunnel with an adjustable propeller according to the invention.

The propeller was set to different values of uniform geometrical pitch varying from a setting giving a constant pitch-diameter ratio of $p/D=0.5$ to a setting giving $p/D=1.1$ along the whole blade, and at each setting the propeller was run under conditions of varying values of advance ratio $V/n.D$. Graphs plotting values of efficiency $\eta$ against advance ratio $V/n.D$ were then drawn, combining the test results obtained at each setting.

The efficiency $\eta$ was defined by the formula $$\eta = \frac{\text{power available}}{\text{power consumed}} = \frac{T.V}{Q.\omega}$$

in which T is the thrust exerted by the propeller in the direction of the axis, V is the free stream velocity, Q is the engine torque applied to the axis of the propeller and $\omega$ the angular velocity of the propeller. Special measures were adopted in order to prevent a reduction of the free stream velocity at the center of the disc area.

The following numerical example will indicate the improvement to be obtained in the efficiency by means of twist adjustment:

The graphs in FIGURE 4 show, that when the propeller is set to the lowest pitch value, $D/D=0.5$, maximum efficiency, $\eta=0.68$, will be attained at a low advance ratio, $J \approx 0.4$. If the propeller is set to the highest value of uniform pitch, $p/D=1.1$, and made to operate at the low advance ratio, $J=0.4$, it will perform at an efficiency value as low as $\eta=0.52$, i.e. 77%

$$\left(\frac{0.52 \times 100}{0.68}\right)$$

of the former, whereas maximum efficiency, $\eta=0.83$, in this case is attained at an advance ratio of $J \approx 0.95$. When set to the low pitch value, $p/D=0.5$, the required r.p.m. of the propeller would have to be $0.95/0.4=2.375$ times higher than the necessary r.p.m. when set to the high pitch value, $p/D=1.1$. Irrespective of the fact that the low pitch setting in that case would imply operation at lower efficiency, viz. $\eta=0.68$ instead of 0.83, the limiting safe upper value of engine r.p.m. would in all probability be exceeded by far.

These results confirm a relationship known by itself, viz., that a flat, low pitched propeller blade is favourable at low air velocities and a twisted, high pitched blade at high air velocities other circumstances being equal.

By comparing FIGURES 3 and 4 it will be noted, that according to FIGURE 4 the difference between the two limiting values of pitch distribution is less than the difference required under actual working conditions accounted for in conjunction with the two limiting cases of optimum pitch distribution shown in FIGURE 3. It follows that under actual working conditions the efficiency gain to be achieved through twist adjustment is higher than the gain computed by means of numbers taken from FIGURE 4.

The shape of blade section taken at different radial distances along a propeller or rotor blade will vary; and assuming the distribution along the blade of the transverse sections of a variable pitch propeller of conventional design to be equivalent to that of a propeller according to the invention, the latter will exhibit an improvement of efficiency of 5–10% and of 10–20% order of magnitude, when operating at the low and the high limiting value of advance ratio respectively, shown in FIGURE 3.

It is now obvious, that the efficiency gain is entirely due to the previously mentioned fact, that for each of the two limiting values of advance ratio J, each section, i.e. blade element, along the whole blade is adjusted to operate at its optimum angle of attack $\alpha$ providing the maximum lift-drag ratio.

Figure 5:
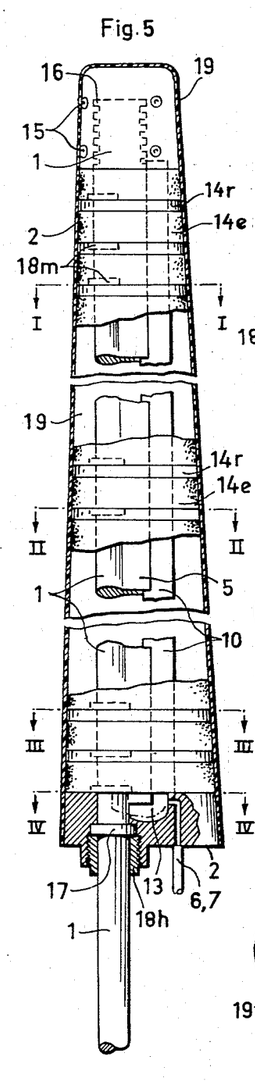
FIGURE 5 is a plan view of a propeller or rotor blade with portions broken away, showing means for mounting the mantle on the rod and fixing it against longitudinal displacement, as well as miscellaneous sealing components and ducts for pressure fluid. The figure displays a transversely laminated mantel according to an embodiment of the invention.

By way of example the FIGURE 5 exhibit an embodiment of a propeller or rotor blade according to the invention.

Each blade comprises a rigid rod 1 cased in a mantle 2 shaped like a twisted airfoil. The rod 1 projects radially from the hub structure, not shown in the drawing, and the mantle 2 is mounted on the rod 1 and is to a limited degree angularly displaceable thereon. A torque may be applied between the mantle 2 and the rod 1 in order to twist the mantle relative to the rod and rotate the propeller blade about a longitudinal axis, further such rotation being attained by applying torque to the rod 1. The rod 1 comprises at least one continuous longitudinal ridge 5 with side faces, that constitute stop surfaces 3 arranged to collaborate with corresponding stop surfaces 4 inside the mantle 2.

When no torque is applied to the mantle 2, it is in a neutral position $I_o$, $II_o$, $III_o$, cf. the FIGURES 5–I, 5–II and 5–III position suffix $o$, from which it is seen that the mantle 2 may be angularly displaced by means of the torque to either of two terminal positions $I_f$, $II_f$, $III_f$ and $I_t$, $II_t$, $III_t$ located on each side of the neutral position $I_o$, $II_o$, $III_o$, and in each of the terminal positions $I_f$, $II_f$, $III_f$ and $I_t$, $II_t$, $III_t$ one or the other side 3 of the ridge 5 fits up against the corresponding surface 4 inside the mantle 2 preventing further movement of the mantle relative to the rod 1.

Since the shape and arrangement of the stop surfaces 3 and 4 are such as to allow the cross sections $III_t$, $III_o$, $III_f$ of the mantle 2 located closer to the root of the blade to be rotated through larger angles from the neutral position $I_o$, $II_o$, $III_o$ than the sections $I_t$, $I_o$, $I_f$ situated towards the tip of the blade, the shape of the mantle 2 will be changed by torsion about a longitudinal axis when the torque is applied in order to twist the mantle relative to the rod.

In neutral position $I_o$, $II_o$, $III_o$ the mantle 2 may exhibit a twisted shape for specified operating conditions, and one of the mentioned terminal positions $I_t$, $II_t$, $III_t$, will exhibit a more twisted shape favourable at higher air speeds, whereas in the other terminal position $I_f$, $II_f$, $III_f$ the shape of the mantle 2 will be flatter and suitable at low and vertical air speeds. The contact between the stop surfaces 3 and 4 when fittting up substantially along the entire active length of the blade set to either of the extreme terminal positions $I_t$, $II_t$, $III_t$ and $I_f$, $II_f$, $III_f$, will provide an accurately defined and firmly supported shape of blade.

The design of the blade exhibited in the FIGURES 5 comprises means by which a fluid under pressure is made to act on the mantle 2 and the rod 1 whereby torque is applied to said members.

Specific features of the design are, that a sealing diaphragm 10 is arranged in slits 11 and 12 passing along the crest of the ridge 5 and along the bottom of a corresponding longitudinal groove inside the mantle 2 in order to prevent leakage and to seal off spaces of clearance 8 and 9 from one another. Two pairs of bellows 13 are arranged between the mantle 2, the rod 1 and the diaphrgam 10 at the hub end of the blade, in order to seal off the clearance spaces 8 and 9 further and prevent leakage of pressure fluid from one clearance space to the other. Two ducts 6 and 7 drilled through the hub end of the mantle 2 and communicating with a reservoir for pressure fluid located independently of the movements of the blades and not shown in the drawings, discharge into the clearance spaces 8 and 9 between the mantle 2 and the rod 1, enabling the fluid to exert pressure on the stop surfaces 3 and 4.

The fluid may thus be made to occupy substantially all cavities 8, 9 between the mantle 2 and the rod 1 over the whole length of the blade making it less liable to undesirable deformation and warping.

Considering the mantle in its neutral position $I_o$, $II_o$, $III_o$, and supposing that the fluid is made to flow via the duct 6 into the clearance space 8 in order to exert pressure on the stop surfaces 3 and 4, the mantle 2 will be twisted, and while the shape of the mantle 2 thus changes, the fluid already present on the other side of the ridge 5 will leave the clearance space 9 and continue to flow back to the reservoir through the duct 7 as long as fluid enters the former clearance space 8 and until the stop surfaces 3, 4 of the latter clearance space 9 fit up against one another, when the mantle 2 has reached the terminal position $I_f$, $II_f$, $III_f$ and a flat blade shape has been attained. The whole procedure is reversed in order to reach the other terminal position $I_t$, $II_t$, $III_t$ and obtain a twisted blade shape.

As exhibited in the FIGURE 5 the embodiment of the invention embraces a propeller or rotor blade with a transversely laminated mantle 2. This does, of course, not exclude the possibility of a mantle formed out of one and the same material only as a single, integral component of the blade.

The mantle 2 is shown to be composed of laminae of different thickness and resilience, and according to the drawing thin, rigid laminae $14r$ and thick, elastic slabs $14e$ alternate radially along the blade. Adjacent laminae are irrotationally attached to one another.

At the blade tip the mantle 2 may suitably consist of two toothed portions held together with rivets 15 and cogging with corresponding teeth 16 cut out of the tip portion of the rod 1.

The section of the rod 1 being circular at its hub end, a threaded thimble $18h$ mounted on the rod 1 at that end and screwed into a siimlarly threaded portion at the hub end of the mantle 2 is in rotatable engagement with an annular flange 17 integral with the rod 1.

A number of thrust bearings $18m$ fitted on the rod 1 at suitable intervals and occupying annular grooves inside the mantle 2 are in rotatable engagement with the surfaces of those annular grooves.

The thimble $18h$, the thrust bearings $18m$ and the tip portion of the mantle 2 all have the effect of preventing the mantle 2 from being longitudinally displaced relative to the rod 1 because of centrifugal forces acting on the mantle 2 during rotation of the propeller. The mantle 2 as shown in the FIGURE 5 is coated with resilient and tough material 19.

During cyclic pitch variation of the rotor of a helicopter or similar aircraft in forward flight, it is not only necessary to increase the blade angle or angle of incidence when the blade is moving aft, but a more twisted blade shape is also called for during that rearward operation of the blade. The well known tendency of overstalling the tip sections on the aft stroke will thus be reduced or prevented. Along the border of the area of flow reversal, however, the horizontal velocity component of the air is zero relative to those further hubward sections of the blade, making the theoretically required blade angle at that border 90°.

It follows that a comparatively flat blade on the forward stroke and a more twisted blade on the backward stroke is required, in order to make each cross section along the whole blade operate more efficiently around the entire circuit.

The propeller or rotor according to the invention is therefore particularly well adapted to be used in connection with conventional cyclic pitch contrivances for helicopter rotors and the like.

Previous arguments have mainly been aimed at considering lightly loaded propellers, and in order to appreciate the potential advantages of not loading a propeller too heavily and giving it a comparatively large diameter, it is important first to keep the following general remarks in mind:

The area swept by a propeller blade per unit time will determine the mass of fluid accelerated per second and this mass will thus be proportional to the square of the length of the diameter.

For a propeller or rotor of large diameter the rate of change of momentum necessary to provide a thrust of a specified magnitude will therefore be made up of the momentum obtained by giving a large mass of air per second a certain velocity change, and the larger the area swept per second, the lower the velocity change required in order to produce a thrust of given magnitude, i.e. the lower the induced velocity $v$. But the power consumed is proportional to the square of the induced velocity $v$, so it follows that in order to keep the power consumption as low as possible it will always be advantageous to accelerate a quantity of fluid the mass per second of which is as large as possible, and give this quantity a low velocity. This explains why a propeller with a large diameter or a rotor has the inherent capacity of yielding a high efficiency.

The advantages of a propeller of large diameter or rotor are confirmed by the unique vertical flight characteristics of the helicopter, which exhibits a higher and more favourable ratio of aircraft weight to engine power consumed than any other type of aircraft in the VTOL field.

A comparatively greater amount of power will therefore be available through the rotor for vertical lift, and the requirements as to low weight/power ratio of the engine itself will be less demanding. In consequence thereof a great assortment of internal combustion reciprocating or turbine engines will be acceptable as power units, enabling the designer of the VTOL rotor aircraft to strike a more generous balance when deliberating upon the advantages of low engine weight versus high economy, i.e. low fuel consumption.

Considerations in conjunction with engine reliability and the more or less serious consequences of engine failure during flight will immediately direct the attention towards the safety factor inherent in the autorotational capability of the rotor in windmilling descent and landing. This capability is unique and does therefore provide extra safety over and above such general measures as the interconnection of the propellers or rotors by cross shafting or otherwise, or the use of two or more mutually independent engine units, so that if one of these would fail the rest would give enough vertical thrust to continue hovering.

The rotor's low induced velocity $v$ will cause a slow and cool slipstream jet. This kind of jet although large in diameter, will in lesser degree be accompanied by such disadvantages and hazards as those due to slipstream impingement of the hot, high velocity jet exhaust from power units such as turboprop and turbojet engines.

The main object of the FIGURE 6 in the drawings is to illustrate some of the fundamental characteristics of propeller or rotor V/STOL thrust-tilting aircraft in order to point out an aeronautic field beyond that of the conventional helicopter, in which the propeller according to the invention is also well suited to find application.

Figure 6A:
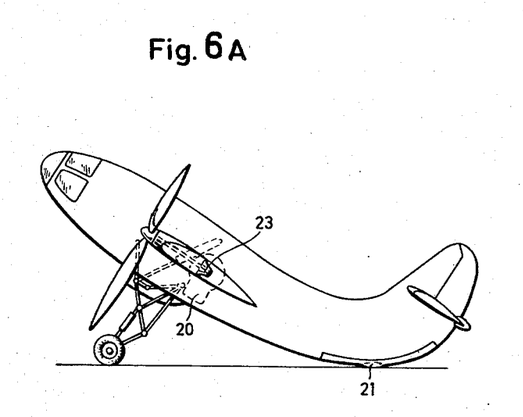

The aircraft shown in FIGURE 6A is in a takeoff, nose-up attitude of approximately 30°, and is supposed to have short takeoff and landing characteristics if provided with a sufficient powerful engine 20.

Figure 6B:
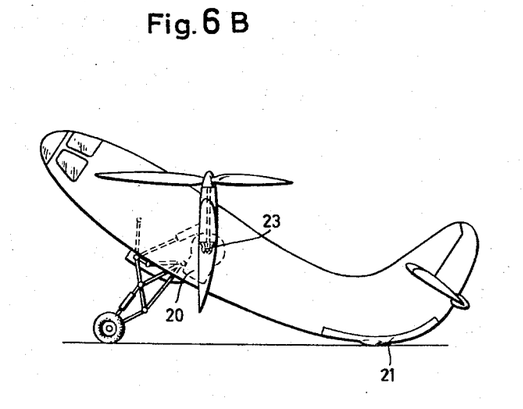

In FIGURE 6B the wing and propeller units have been tilted upwards through an angle of approximately 60° enabling the aircraft to take off and land vertically.

Figure 6C:
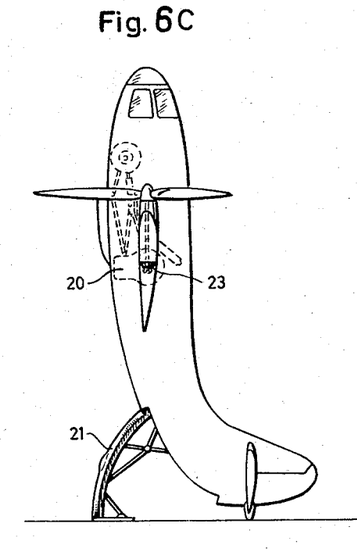
Figure 6D:
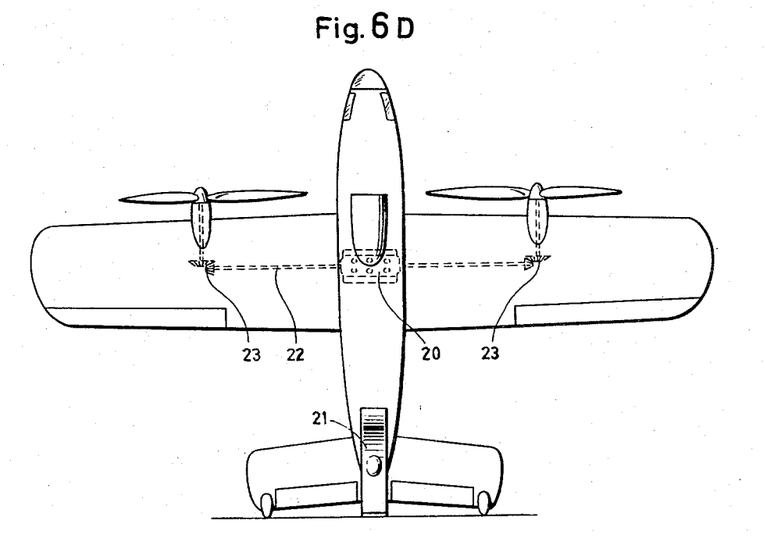

FIGURE 6C is a side view and FIGURE 6D a plan view of the aircraft in a tail sitting attitude for vertical takeoff. A tail-skid plate 21 has been swung out to support the aircraft in its vertical position. It is seen from FIGURE 6D that a cross shaft 22 transfers the engine torque via reduction gears 23 to the axes of the starboard and port propellers making them both rotate at the same low r.p.m.

In transition to horizontal flight the wing and propellers as shown in FIGURE 6B are tilted and take up the position shown in FIGURE 6A, whereas the whole aircraft as shown in the FIGURES 6C, 6D will be tilted forward an angle of approximately 90°. It is realised that under vertical flight conditions and in hovering, the propellers are accelerating air that is originally at rest, whereas in horizontal flight they accelerate oncoming air the velocity of which is equal and opposite to the true air speed of the aircraft. The propellers will thus have to operate at two well defined and steady advance ratios $V/n.D$ of great difference.

In order to determine the general circumstances under which the advantage of blade twist adjustment will be most favourably realised, it is perhaps first necessary to keep in mind that the fixed degree of blade twist of any conventional solid propeller blade is always a compromise between the demands for higher static takeoff thrust, requiring a flatter and lower pitched blade, and the demands of cruising and high speed flight conditions requiring a more twisted blade of higher pitch. The result of the compromise is a blade too twisted to provide the highest static thrust and too flat for efficient propulsion in horizontal flight.

According to the momentum theory of propellers the propulsive efficiency $\eta$ in terms of the free stream velocity $V$ is expressed as $$\eta = \frac{V}{V+v} = \frac{1}{1+\frac{v}{V}}$$

implying, that the efficiency $\eta$ as previously explained is inversely proportional to the induced velocity $v$.

This would seem to indicate that the induced velocity $v$ could always be reduced and the efficiency $\eta$ thus improved by unlimited lengthening of the diameter, because the larger the diameter, the lower will be the induced velocity $v$. A disadvantage of the propeller with large diameter in horizontal flight is, however, that the drag, i.e. is the loss due to friction and turbulence as the blade moves through the medium, increases as the diameter becomes greater, so that it does not improve the efficiency of actual propellers, let alone for reasons of increasing weight, to add infinitely to the blade length; but if the blade twist is adjusted to fit the high speed flow conditions, it is obvious that the drag will be reduced so that the upper limit of efficient diameter length will be reached later, i.e. at greater optimum blade length.

During transition from hovering to horizontal flight of any thrust tilting convertible aircraft, there will be a great increase of the air velocity in conjunction with a large drop of the required engine power. Both these occurrences will reduce the loading of the propeller tending to make it rotate faster, and in order to prevent exceeding the safe limit of the r.p.m. the propeller must be adjusted to operate at a much higher advance ratio $V/n.D$. If the means of propulsion is a tilt rotor with solid blades, this adjustment can only be brought about by a correspondingly great increase of the pitch through the collective pitch control, which incidentally is equivalent to the means for adjusting the pitch of conventional variable pitch propellers.

This change of pitch will, however, as previously explained in conjunction with FIGURE 3 not be uniformly distributed but will, in proportion to the length of the rotor blade, be much too large at the tip sections and too small at the root sections, so that the outer portion of the blade will be attacking the air at a too large angle and the hub part with a too small angle of attack, leaving only a minor efficient blade portion situated between the two. In consequence thereof the thrust forces will not either be advantageously distributed along the blade, and since most of its sections, if not reversed or overstalled, are operating at unfavourable lift drag ratios, the sum of the drag forces acting on the blade will be considerable, lowering the efficiency in a corresponding degree.

The conclusion to be drawn from this course of events and from what has been explained in connection with FIGURE 3 and previously regarding the gain in efficiency, as well as from the fact that the divergence from the desired uniform pitch distribution is proportional to the magnitude of the angle of adjustment of the blade are, that the efficiency gain will be proportional to the magnitude of the difference of the advance ratios of operation; but the divergence just mentioned is also proportional to the length of the blade, so there is evidently a particularly great efficiency gain to be attained by adapting the blade twist of a long blade to the flow conditions in horizontal flight.

In conjunction with the derivation of Equation 6 it was mentioned that there is not much interference of the flow through the outer parts of the disc area of a lightly loaded propeller, so that when the mentioned drop of propeller loading in connection with transition has taken place, a substantially uniform velocity field parallel to the propeller axis will exist in the fluid passing through the outer disc area, particularly so in the case of the least loaded of propellers in horizontal flight, viz. the rotor.

The circumstances influencing the degree to which blade twist adjustment will improve efficiency may now briefly and within the limits of reasonably normal operating conditions, be summarized as being proportional to the magnitude of the difference of the advance ratios of operation,
the length of the diameter, and
the inverted value of the induced velocity, i.e. the quantity $1/v$.

A problem found during cruising flight of the tilt-rotor convertible aircraft is a surging fore and aft motion of the aircraft along the flight path. This is probably explained by the fact that the pitch distribution of the solid rotor blades is not well adapted to to the flow conditions, so that a small change of the axial flow conditions due to atmospheric turbulence and the like would result in over-stalling of the blades at the outer part of the disc area, producing a great change of the lift drag ratios of the blade sections operating in that area, and thus sudden changes of the propelled (rotor) thrust and engine torque causing intermittent accelerations and decelerations of the aircraft.

An aircraft fitted with rotors or propellers the blades of which have had their twist properly adjusted to the advance ratio will in all probability not experience this surging motion to the same extent. The twist adjusted blade will be operating close to the maximum point of its well rounded efficiency curve, cf. FIGURE 4, and will therefore not experience the same abrupt changes in thrust and drag.

As a matter of course the low drag of the twist adjusted blades will bring about a reduction of the disadvantages entailed in slipstream rotation.

It was previously seldom necessary to operate the same propeller continuously at advance ratios of great difference, and that is perhaps the reason why the advantages to be gained by twist adjustment have not yet been appreciated, because they have previously not clearly come to the fore. It is perhaps also the novelty of the idea of tilting the propulsive thrust through an angle approximating 90° and applying this principle to VTOL aircraft, as well as the present state of the art regarding the usual propulsion of rotor aircraft in horizontal flight by cyclic pitch control which has made it difficult to realize the considerable improvement of efficiency and further unique advantages to be obtained by reducing the drag of the propeller of large diameter, rotor or tilt-rotor in the horizontal flight condition, and that blade twist adjustment is one of the most effective means by which this reduction may be brought about.

There are, however, other circumstances not previously mentioned that further add to the advantages attained by making the VTOL aircraft as small and light as possible. These will appear from the following argument:

Two aircraft of different size are said to be geometrically similar if the proportion between all similar linear dimensions of the two has the same constant values; but according to the square/cube law the surface areas of the smaller aricraft will be larger as compared to its volume and weight. The disc area of the smaller aircraft will therefore be comparatively larger relative to its weight than the disc area of the bigger aircraft, and this will in turn lead to a further lowering of propeller stresses and disc loading, a better performance in vertical and hovering flight, etc., i.e. an enhancement of the advantages already mentioned in conjunction with lightly loaded propellers.

If the VTOL aircraft is ever to be popularized and made accessible to greater numbers, it appears to be a disadvantage applying VTOL principles to large and heavy aircraft.

Thrust-tilting rotor propulsion applied to the light convertible aircraft seems to be the VTOL field of the future, and this is where the principle of adjustable propeller blade twist gives some of the most advantageous results.

I claim:

1. A variable pitch propeller or rotor having two or more blades, each blade consisting of a rigid rod (1) extending radially from a a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment and allowing different transverse sections of the mantle (2) different degrees of displacement relative to the rod (1).

2. A variable pitch propeller or rotor having two or more blades, each blade consisting of a rigid rod (1) extending radially from a a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment and allowing different transverse sections of the mantle (2) different degrees of displacement relative to the rod (1), said continuous means enabling the blade to be adjusted to different values of geometrical pitch, distributed substantially uniformly along the outer, aerodynamically active part or working portion of the blade and decreasing continuously and progressively towards the root of the blade.

3. A variable pitch propeller or rotor having two or more blades, each blade consisting of a rigid rod (1) extending radially from a a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment and allowing different transverse sections of the mantle (2) different degrees of displacement relative to the rod (1), the geometrical pitch having a substantially uniform distribution along the outer, aerodynamically active part or working portion of the blade and decreasing continuously and progressively towards the root of the blade when no torque is applied to the mantle and rod.

4. A variable pitch propeller or rotor having two or more blades, each blade consisting of a rigid rod (1) extending radially from a a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment and allowing different transverse sections of the mantle (2) different degrees of displacement relative to the rod (1), and that in one of the positions of angular adjustment the blade is adapted to a distribution of geometrical pitch, determined by setting of the geometrical pitch- or blade angle $\beta$ to values defined by the formula $$\beta = \alpha_0 + \frac{\Delta}{x^{1/2}}$$

$x$ being the dimensionless radius or station of the blade, and $\alpha_0$ and $\Delta$ constants.

5. A variable pitch propeller or rotor having two or more blades, each blade consisting of a rigid rod (1) extending radially from a a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment and allowing different transverse sections of the mantle (2) different degrees of displacement relative to the rod (1), the geometrical pitch- or blade angle $\beta$ having the values defined by the formula $$\beta = \alpha_0 + \frac{\Delta}{x^{1/2}}$$

when no torque is applied to the mantle and rod; $x$ being the dimensionless radius or station of the blade, and $\alpha_0$ and $\Delta$ constants.

6. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, there being means disposed substantially over the entire continuous length of the mantle (2) and the rod (1) for limiting the displacement of the mantle (2) in different positions of angular adjustment and allowing different transverse sections of the mantle (2) different degrees of displacement relative to the rod (1).

7. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a troque may be applied to the mantle (2) and the rod (1) in order to angularly displace and twist the mantle (2) relative to the rod (1) and rotate the blade about a longitudinal axis, there being collaborating stop surfaces (3, 4) arranged continuously along the mantle (2) and the rod (1) for limiting the displacement of the mantle (2) in different positions of angular adjustment and allowing different transverse sections of the mantle (2) different degrees of displacement relative to the rod (1).

8. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a torque may be applied to the mantle (2) and the rod (1) in order to angularly displace and twist the mantle (2) relative to the rod (1) and rotate the blade about a longitudinal axis, the rod (1) comprising at least one continuous longitudinal ridge (5) with side faces (3) constituting stop surfaces arranged along the rod (1) in order to collaborate with corresponding stop surfaces (4) inside the mantle (2), said surfaces (3, 4) being disposed substantially over the entire length of the blade in order to limit the displacement of the mantle (2) in different positions of angular adjustment and allowing different transverse sections of the mantle (2) different degrees of displacement relative to the rod (1).

9. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure is made to act on the mantle (2) and the rod (1) whereby torque is applied to those two members (1, 2) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment and allowing different transverse sections of the mantle (2) different degrees of displacement relative to the rod (1).

10. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure is made to act on the mantle (2) and the rod (1) whereby torque is applied between those two members (1, 2) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

11. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed aginst longitudinal displacement, means by which a fluid under pressure is made to act on stop surface (3, 4) disposed along the mantle (2) and the rod (1) whereby torque is applied between those two members (1, 2) in order to angularly displace and twist the mantle (2) relative to the rod (1)

and rotate the blade about a longitudinal axis, said stop surfaces (3, 4) being arranged to limit the displacement of the mantle (2) in different positions of angular adjustment allowing different transverse sections different degrees of displacement relative to the rod (1).

12. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure is made to act on stop surfaces (3, 4) disposed continuously along the mantle (2) and the rod (1) whereby torque is applied between those two members (1, 2) in order to angularly displace and twist the mantle (2) relative to the rod (1) and rotate the blade about a longitudinal axis, said stop surfaces (3, 4) being arranged to limit the displacement of the mantle (2) in different positions of angular adjustment allowing different transverse sections different degrees of displacement relative to the rod (1).

13. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure occupying substantially all cavities (8, 9) between the mantle (2) and the rod (1) is made to act on those two members (1, 2) whereby torque is applied between the mantle (2) and the rod (1) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment allowing different transverse sections different degrees of displacement relative to the rod (1).

14. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure occupying substantially all cavities (8, 9) between the mantle (2) and the rod (1) is made to act on those two members (1, 2) whereby torque is applied to the mantle (2) and the rod (1) in order to angularly displace and twist the mantle (2) relative to the rod (1) and rotate the blade about a longitudinal axis, there being means disposed continuously along the mantle (2) and the rod (1) for limiting the displacement of the mantle (2) in different positions of angular adjustment allowing different transverse sections different degrees of displacement relative to the rod (1).

15. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure is made to act on the mantle (2), the rod (1) and one or more sealing diaphragms (10) arranged therebetween, whereby torque is applied between the former two members (1, 2) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

16. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure is made to act on the mantle (2) and the rod (1) by means of one or more sealing diaphragms (10) and sealing bellows (13) arranged between the mantle (2) and the rod (1), whereby torque is applied between those latter two members (1, 2) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

17. A variable pitch propeller or rotor having two or more blades, each blade consisting of a rigid rod (1) extending radially from a central hub of rotation and a mantle (2) shaped like a twisted airfoil enveloping the rod (1) and mounted thereon fixed against longitudinal displacement, means by which a fluid under pressure occupying cavities (8, 9) between the mantle (2) and the rod (1) is made to act on stop surfaces (3, 4) disposed along the mantle (2) and the rod (1) in order to angularly displace and twist the mantle (2) relative to the rod (1) and rotate the blade about a longitudinal axis, said stop surfaces (3, 4) being arranged to limit the displacement of the mantle (2) in different positions of angular adjustment allowing different transverse sections different degrees of displacement relative to the rod (1).

18. A variable pitch propeller or rotor having two or more blades, each blade consisting of a rigid rod (1) extending radially from a central hub of rotation and a transversely laminated mantle (2) shaped like a twisted airfoil enveloping the rod (1) and mounted thereon fixed against longitudinal displacement, means by which a torque may be applied between the mantle (2) and the rod (1) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

19. A variable pitch propeller or rotor having two or more blades, each blade consisting of a rigid rod (1) extending radially from a central hub of rotation and a laminated mantle (2) with each lamina (14r, 14e) connected to adjacent laminae (14e, 14r), the mantle (2) being shaped like a twisted airfoil enveloping the rod (1) and mounted thereon fixed against longitudinal displacement, means by which a torque may be applied between the mantle (2) and the rod (1) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

20. A variable pitch propeller or rotor having two or more blades, each blade consisting of a rigid rod (1) extending radially from a central hub of rotation and a laminated mantle (2) composed of laminae (14r, 14e) of different thickness and resilience, the mantle (2) being shaped like a twisted airfoil enveloping the rod (1) and mounted thereon fixed against longitudinal displacement, means by which a torque may be applied between the mantle (2) and the rod (1) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

21. A variable pitch propeller or rotor having two or more blades, each blade consisting of a rigid rod (1) extending radially from a central hub of rotation and a laminated mantle (2) coated with a resilient and tough material (19), the mantle (2) being shaped like a twisted airfoil enveloping the rod (1) and mounted thereon fixed against longitudinal displacement, means by which a torque may be applied between the mantle (2) and the rod (1) in order to angularly displace and twist the mantle (2) relative to the rod (1) and rotate the blade about a longitudinal axis, there being means disposed along the mantle (2) and the rod (1) for limiting the displacement of the mantle (2) in different positions of angular adjustment and allowing different transverse sections of the mantle (2) different degrees of displacement relative to the rod (1).

References Cited by the Examiner

UNITED STATES PATENTS

| | | | |
|---|---|---|---|
| 2,475,121 | 7/1949 | Avery | 170—160.5 X |
| 2,484,099 | 10/1949 | Koeppe | 170—160.5 X |
| 2,584,663 | 2/1952 | Bensen | 170—160.5 X |
| 2,597,769 | 5/1952 | Ashkenas | 92—90 X |
| 2,627,928 | 2/1953 | Mullgardt | 170—160.5 X |
| 2,661,806 | 12/1953 | Nims et al. | |

FOREIGN PATENTS

| | | |
|---|---|---|
| 11,763 | 1847 | Great Britain. |
| 465,473 | 5/1937 | Great Britain. |
| 880,590 | 10/1961 | Great Britain. |

MARK NEWMAN, *Primary Examiner.*

JULIUS E. WEST, *Examiner.*

W. E. BURNS, *Assistant Examiner.*